(12) United States Patent
Nourbakhsh et al.

(10) Patent No.: US 8,693,418 B2
(45) Date of Patent: Apr. 8, 2014

(54) MODULAR RADIO NETWORK ACCESS DEVICE

(75) Inventors: Seyed-Hami Nourbakhsh, Nuremberg (DE); Matthias Biegel, Nuremberg (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 292 days.

(21) Appl. No.: 13/129,297

(22) PCT Filed: Oct. 30, 2009

(86) PCT No.: PCT/EP2009/064376
§ 371 (c)(1),
(2), (4) Date: Jul. 29, 2011

(87) PCT Pub. No.: WO2010/054941
PCT Pub. Date: May 20, 2010

(65) Prior Publication Data
US 2011/0280204 A1 Nov. 17, 2011

Related U.S. Application Data

(60) Provisional application No. 61/117,643, filed on Nov. 25, 2008.

(30) Foreign Application Priority Data

Nov. 14, 2008 (EP) ..................................... 08019941

(51) Int. Cl.
*H04W 72/04* (2009.01)
(52) U.S. Cl.
USPC ........................................ 370/329; 455/552.1

(58) Field of Classification Search
USPC ............ 455/552.1, 435.1; 370/329, 352, 331; 342/352
See application file for complete search history.

(56) References Cited

U.S. PATENT DOCUMENTS

2008/0246651 A1* 10/2008 Schmidt et al. ............... 342/352

FOREIGN PATENT DOCUMENTS

| WO | 98/14023 | 4/1998 |
| WO | 2004/062137 A1 | 7/2004 |

OTHER PUBLICATIONS

Author Unknown. "IDT Low-Power Multi-Port Products." Product Flyer, Integrated Device Technology, Inc., 2004.

* cited by examiner

*Primary Examiner* — Phuoc H Doan
(74) *Attorney, Agent, or Firm* — Coats and Bennett PLLC

(57) ABSTRACT

A modular device for providing network access in accordance with at least two radio access technologies is described. The device includes a first hardware module comprising a first hardware accelerator adapted to perform at least layer (1) processing in accordance with a first radio technology, software-controlled processing resources adapted to perform at least layer (2) processing for the first radio access technology and for a second radio access technology, and a first interface adapted to couple the software-controlled processing resources to a second hardware module providing at least layer (1) processing capabilities in accordance with the second radio access technology. The second hardware module may comprise a second hardware accelerator adapted to perform at least layer (1) processing in accordance with the second radio access technology and a second interface adapted to couple the second hardware accelerator to the first interface of the first hardware module.

19 Claims, 6 Drawing Sheets

MODULAR RADIO NETWORK ACCESS DEVICE

TECHNICAL FIELD

The present invention generally relates to a radio network access device having a modular configuration. Specifically, the invention concerns a modular radio network access device that supports two or more different radio access technologies.

BACKGROUND

In the last two decades, digital mobile communication technologies have almost fully replaced analog mobile communication systems, commonly referred to as first generation systems. With the early digital communication systems (or second generation systems) such as the Global System for Mobile communication (GSM), a wide-spread acceptance and use of mobile telephony services has begun. Today, third generation systems such as the Universal Mobile Telecommunication System (UMTS) as standardized by the $3^{rd}$ Generation Partnership Project (3GPP) offer a plethora of sophisticated multimedia features and novel mobile applications including, for example, personal navigation via the Global Positioning System (GPS). Fourth generation technologies are already about to enter the standardization phase.

Since the earliest Release 99 of the 3GPP specifications, UMTS uses W-CDMA (Wideband Code Division Multiple Access) as high speed transmission protocol on the air interface. The performance of the W-CDMA-based UMTS standard is extended and improved by a collection of technologies known as High Speed Packet Access (HSPA) protocols. Two different protocols, High Speed Downlink Packet Access (HSDPA) and High Speed Uplink Packet Access (HSUPA), have been standardized by 3GPP. HSPDA is part of the UMTS specifications since Release 5, while the specifications for HSUPA are included in Release 6.

A further enhancement of the UMTS standard, Evolved HSPA (eHSPA) or HSPA+, will be introduced with Release 7. Evolved HSPA provides even higher data rates on both the uplink and the downlink using sophisticated technologies such as antenna diversity (Multiple Input Multiple Output, or MIMO) and higher order modulation. While eHSPA still relies on W-CDMA, the Long Term Evolution (LTE) project of 3GPP is defining a new air interface that will be implemented with Release 8 of the 3GPP specifications.

The various "Releases" of the 3GPP specifications exist in parallel to provide developers with a stable platform for implementation while at the same time allowing the addition of new technical features. Each Release can be considered as a separate Radio Access Technology (RAT), although it will incorporate certain features of the previous Releases.

The parallel existence of various Releases makes it desirable for a single item of hardware (such as a mobile telephone) to provide support for RATs defined in different Releases. Such multi-Release support increases the overall connectivity. As one example, a multi-Release mobile telephone may automatically perform radio access via an "older" Release RAT if the locally available radio network infrastructure is not compatible with a newer Release RAT also supported by the mobile telephone. Then, an automatic handover from the older Release RAT to the newer Release RAT is performed as soon as the mobile telephone enters the coverage area of radio network infrastructure supporting the newer Release RAT.

In mobile telephones, support for a new Release (either singly or in combination with support for one or more previous Releases) also requires a new hardware design. The hardware that needs to be re-designed typically includes Application Integrated Circuits (ASICs), Field Programmable Gate Arrays (FPGAs), and Digital Signal Processors (DSPs). If, for example, a new Release specifies a more sophisticated modulation scheme, the design of the existing baseband ASIC which only supports the modulation scheme of the previous Release has to be changed. Such a design change involves new Non-Recurring Engineering (NRE) cost. Additionally, the ASIC re-design introduces new technology risks, including ASIC lead time and re-spin efforts resulting from design bugs that are only detected at a late stage of the ASIC development process.

In cases in which the ASIC is re-designed to support the new Release in addition to one or more previous Releases (i.e., to support two or more RATs), additional support for the novel features of the new Release will lead to a larger ASIC die size, which is undesirable for various reasons. Moreover, there is also the risk that the new Release will not be accepted on the market. In such a case, the re-designed ASIC—although also supporting the widely accepted previous Release—can not be cost-efficiently incorporated into end-consumer devices. An ASIC supporting multiple Releases thus generally decreases the technological flexibility of device manufacturers.

SUMMARY

There is a need for a device that supports two or more radio access technologies and has an efficient design avoiding one or more of the drawbacks outlined above.

This need is satisfied by a device for providing network access in accordance with at least two radio access technologies (RATs). The device includes a first hardware module comprising a first hardware accelerator adapted to perform at least layer 1 processing in accordance with a first RAT, first software-controlled processing resources adapted to perform at least layer 2 processing for the first RAT and for a second RAT, and a first interface adapted to couple the software-controlled processing resources to a second hardware module providing at least layer 1 processing capabilities in accordance with the second RAT.

In one variation, the first hardware module may be derived from an existing hardware module (such as an existing baseband ASIC) supporting the first RAT. The first RAT may be a 3GPP RAT (e.g., according to a previous, or current, 3GPP Release) or a non-3GPP RAT. Spare software-controlled processing resources of the first hardware module may be (re-) used to perform specific processing tasks for the second RAT, which may again be a 3GPP RAT (e.g., according to a new 3GPP Release) or a non-3GPP RAT. As a result, only the remaining processing tasks required by the second RAT need to be performed by the second hardware module.

The second hardware module may thus be disburdened from certain processing tasks relating to the second RAT and as a result can be configured in a lean fashion (e.g., not necessarily as an ASIC). As a further result, the second hardware module may be designed and manufactured independently from the first hardware module. Moreover, the first hardware module may be re-used in various device configurations, and in particular in device configurations not incorporating the second hardware module. Such an approach allows a fast introduction of a new RAT with only minor impacts on the first hardware module. An advantageous processing option that can now be realized is load sharing between the first hardware module and second hardware module in relation to second RAT processing operations.

Load sharing is a particular advantage in cases in which the second RAT provides higher data rates than the first RAT and thus consumes more processing resources.

As understood herein, a hardware module is a delimited item of integrated circuitry (such as a chip or chip set). The hardware module may comprise or consist of at least one of an ASIC, an FPGA and a DSP. The hardware module may also comprise multiple such hardware components. Moreover, the hardware module may comprise dedicated interfaces for communicating with one or more other hardware modules or other items of circuitry. Such interfaces comprise hardware interfaces, software interfaces and combinations thereof.

A hardware accelerator is a piece of hardware that performs predefined processing operations typically faster than software-controlled processing resources. The hardware accelerator may be integrated in an ASIC or a DSP.

Software-controlled processing resources may comprise at least one processor such as a Central Processing Unit (CPU). The CPU may be integrated in an ASIC or a DSP. Alternatively, the CPU may also be realized in a stand-alone configuration. The software-controlled processing resources may be coupled to one or more memories that store processing instructions (such as a computer program) for controlling the software processing operations performed by the processor.

In relation to the present disclosure, a layer is a collection of one or more conceptually similar communication functions (or communication protocols) that generally provides services to a layer above it and receives services from a layer below it. There exist various models defining the succession of the individual layers, such as the 7 layer reference model of the Open Systems Interconnection (OSI) initiative. Other common definitions specify models with less layers (such as the 5 layer Transmission Control Protocol, or TCP, model).

Layer 1 (also called physical layer) functions generally translate communication requests from layer 2 (also called link layer) functions into hardware-specific operations to affect transmission or reception of data. As such, there will be no further "layer" below layer 1. Layer 2 functions generally handle the transfer of data between network entities. Layer 2 functions may additionally detect and possibly correct errors that may occur in layer 1.

In the context of the present disclosure, layer 1 processing may include one or more of the following signal processing operations: Signal modulation, signal spreading, channel coding, transmission error control, turbo coding and encryption (ciphering).

Moreover, layer 2 processing may include one or more of the following signal processing operations: Medium Access Control (MAC), Radio Link Control (RLC), and Packet Data Convergence Protocol (PDCP) processing.

In one configuration, the device comprises the first hardware module only (e.g., in the sense of a semi-finished article). In another configuration, the device comprises both the first hardware module and the second hardware module.

The second hardware module may comprise a second hardware accelerator adapted to perform at least layer 1 processing in accordance with the second RAT. Moreover, the second hardware module may comprise a second interface adapted to couple at least the second hardware accelerator to the first interface of the first hardware module. Still further, the second hardware module may also comprise second software-controlled processing resources. The second software-controlled processing resources may be adapted to perform at least one of layer 1 processing, layer 1 hardware accelerator control, supplemental layer 2 processing and layer 3 processing for the second RAT.

In one implementation, the device also comprises a shared memory adapted to enable a memory-based communication between at least the first software-controlled processing resources of the first hardware module and the second software-controlled processing resources of the second hardware module. The memory based communication may additionally, or in the alternative, involve at least one of the first and second hardware accelerator.

The shared memory may reside on either one or on both hardware modules. Moreover, the shared memory may, at least partially, be external to both hardware modules and may be accessible via external memory interfaces.

At least one of the first hardware module and the second hardware module may comprise an interface processor adapted to synchronize accesses to the shared memory by components of the first hardware module and the second hardware module. When, for example, the shared memory resides at least partially on the first hardware module or can be accessed as external memory via the first hardware module, the interface processor may be located on the first hardware module and may be coupled between the second hardware module and the shared memory. In such an implementation, the interface processor may further be adapted to hide the internal configuration of the first hardware module from accesses from the second hardware module. To hide the internal configuration of the first hardware module, the interface processor may apply encryption (ciphering) techniques. To this end, proprietary encryption techniques or standard encryption techniques (including symmetrical techniques such as DES and asymmetrical techniques such as RSA) may be applied. The interface processor may be realized as CPU having access to at least one memory that stores processing instructions (such as a computer program) for controlling the software processing operations performed by the CPU.

The first software-controlled processing resources residing on the first hardware module may comprise a first processor (e.g., a first CPU) adapted to perform at least layer 2 processing for the first RAT and a second processor (e.g., a second CPU) adapted to perform at least layer 2 processing for the second RAT. In one implementation, the first processor performs layer 2 processing for the second RAT in a first communication direction (e.g., in the uplink direction) and the second processor performs layer 2 processing for the second RAT in a second communication direction opposite to the first communication direction (e.g., in the downlink direction).

In cases in which a single hardware module comprises multiple processors, such as in the case of distributed layer 2 processing discussed above, an inter-processor communication link between the processors may be established. The inter-processor communication link can be used for various communication purposes. For example, in cases of distributed layer 2 processing the communication link may be adapted to synchronize layer 2 processing between the first processor and the second processor. The synchronization can be performed for the second RAT between communications in the first communications direction handled by the first processor and communications in the second communications direction handled by the second processor.

The inter-processor communication may comprise a message-based communication or a memory-based communication. The memory-based communication may be performed using a shared memory as outlined above.

At least one of the first processor and the second processor may further perform layer 3 processing (such as Radio Resource Control (RRC) processing). In such a configuration, the inter-processor communication link may be adapted to send at least one of layer 3 configuration commands and set up commands (e.g., for the second RAT) from the first processor to the second processor, or vice versa. The inter-processor communication link may also be used for synchronization purposes between software modules running on different processors (but, e.g., pertaining to the same communication protocol functions).

At least one of the first hardware accelerator and the second hardware accelerator may be comprised by an Intellectual Property (IP) block (also referred to as IP core or logic core). The corresponding IP block may constitute a building block within the first or second hardware module (e.g., a building block within an ASIC design, a DSP design or an FPGA design).

In one device implementation, the first hardware module comprises an ASIC, and the second hardware module comprises at least one of a DSP and an FPGA. In an alternative implementation, the second hardware module comprises an ASIC.

As has been mentioned above, the first RAT and the second RAT may be 3GPP technologies or non-3GPP technologies. In one specific implementation, the first RAT is a 3GPP Release 6 or lower RAT, whereas the second RAT is a 3GPP Release 7 or higher RAT.

Procedural aspects of the present invention may also be embodied in a method and a computer program product. The computer program product comprises program code portions for performing one or more of the steps of one or more of the methods described herein when the computer program product is run or executed on one or more processors. The computer program product may be stored on a computer-readable recording medium such as a permanent or re-writable memory, a CDROM, or a DVD. The computer program product may also be provided for download via a computer network such as the Internet, a mobile communication network or a wireless or wired Local Area Network (LAN).

BRIEF DESCRIPTION OF THE DRAWINGS

In the following, further technical details and advantages will be discussed in connection with exemplary embodiments illustrated in the drawings, wherein.

DETAILED DESCRIPTION

In the following description, for purposes of explanation and not limitation, specific details are set forth, such as specific device configurations and specific signalling scenarios in order to provide a thorough understanding of the techniques disclosed herein. It will be apparent to one skilled in the art that these techniques may be practiced in other embodiments that depart from these specific details. The skilled artisan will appreciate, for example, that the techniques discussed herein may be practiced in combination with other device configurations and different signalling steps. Moreover, while the following embodiments will primarily be described in relation to RATs conforming to various 3GPP Releases, it will be readily apparent that the techniques described herein may also be practiced in context with one or more non-3GPP RATs.

Those skilled in the art will further appreciate that the methods, steps and functions explained herein may be implemented using individual hardware circuitry, using software functioning in conjunction with a programmed microprocessor or general purpose computer, using one or more ASICs, one or more DSPs and/or one or more FPGAs. It will also be appreciated that the techniques disclosed herein may be embodied in a processor and a memory coupled to the processor, wherein the memory stores one or more programs that perform the steps discussed herein when executed by the processor.

Figure 1:
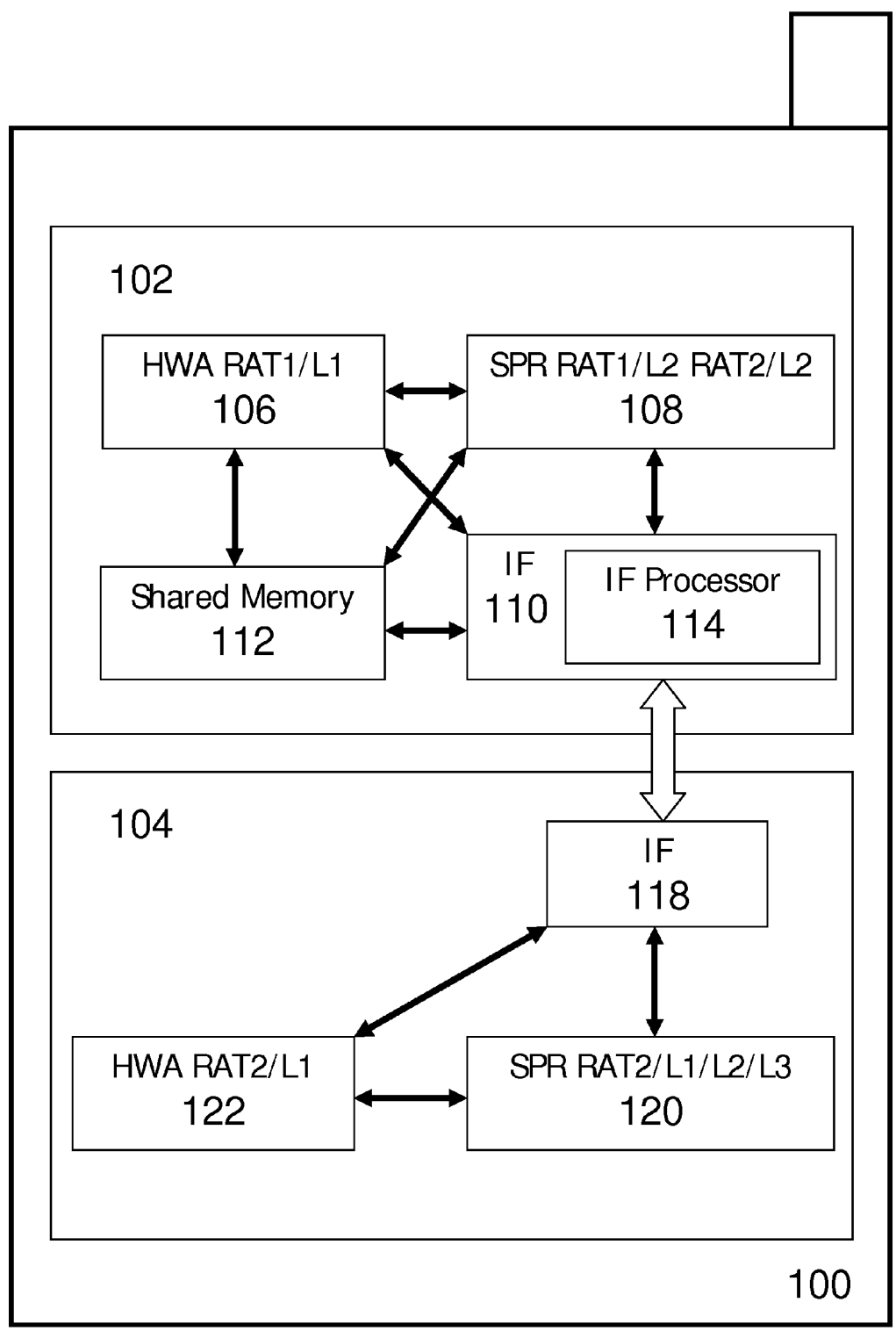
FIG. 1 shows a first embodiment of a device for providing network access in accordance with two radio access technologies.

Reference is now made to FIG. 1, which shows an exemplary configuration of a device 100 for providing network access in accordance with two RATs. In the exemplary embodiment, the device 100 is configured as a mobile telephone. It will be appreciated that in alternative embodiments, the device 100 could also be realized in the form of a data or network card to be used, for example, in conjunction with a mobile computer.

As illustrated in FIG. 1, the device 100 comprises two separate hardware modules 102, 104 configured to communicate with each other. The first hardware module 102 comprises a plurality of components, including a hardware accelerator 106, software-controlled processing resources 108, an interface 110 as well as a shared memory 112. The hardware accelerator 106 is adapted to perform layer 1 processing in accordance with a first RAT. As understood herein, layer 1 processing generally includes at least one of signal modulation, signal spreading, channel coding, transmission error control, turbo coding and encryption.

As shown in FIG. 1, the hardware accelerator 106 is configured to communicate with the software-controlled processing resources 108. The software-controlled processing resources 108 comprise one or more CPUs with access to one or more memories (not shown) that store processing instructions for controlling the software processing operations performed by the one or more CPUs. In one variant, the one or more memories are located on the hardware module 102. In another variant, the one or more memories are located externally to the hardware module 102 but are accessible from the hardware module 102 via suitable external memory interfaces. The software-controlled processing resources 108 are adapted to perform layer 2 processing for the first RAT as well as layer 2 processing for a second RAT. As understood herein, layer 2 processing comprises one or more of MAC, RLC and PDCP processing.

The processing resources 108 are coupled via a communication link to the interface 110. The interface 110 is adapted to couple the processing resources 108 to the second hardware module 104. As will be discussed in more detail below, the second hardware module 104 provides layer 1, supplemental layer 2 as well as optional layer 3 processing capabilities in accordance with the second RAT.

In the embodiment illustrated in FIG. 1, communication between a component of the first hardware module 102 and a component of the second hardware module 104 is performed via the shared memory 112 illustrated in FIG. 1 as part of the first hardware module 102 ("memory-based communication"). It should be noted that in alternative embodiments, the shared memory 112 could partially or completely be located on the second hardware module 104 or externally to both hardware modules 102, 104.

The memory-based communication between components located on the different hardware modules 102, 104 is controlled by an interface processor 114 which belongs to the interface 110. The interface processor 114 is adapted to synchronize accesses to the shared memory 112 by components of the two hardware modules 102, 104.

The second hardware module 104 is coupled to the interface 110 of the first hardware module 102 via a complementary interface 118. The interface 118 is adapted to couple one or more components of the second hardware platform 104 via the interface 110 to one or more components of the first hardware module 102. The components of the second hardware module 104 comprise software-controlled processing resources 120 (in the form of a CPU) and a further hardware accelerator 122. The processing resources 120 are adapted to perform supplemental layer 2 processing as well as layer 3 processing in accordance with the second RAT. Further layer 1 processing in relation to the second RAT is performed by the hardware accelerator 122. The hardware accelerator 122 may be controlled by the software-controlled processing resources 120.

As may be gathered from FIG. 1, the first hardware module 102 performs layer 2 processing in accordance with the second RAT. In some situations, the first hardware module 102 may additionally perform at least portions of layer 1 and layer 3 processing in accordance with the second RAT. As a result, the second hardware module 104 is disburdened from the corresponding layer 2 (and, optionally, layer 1 and/or layer 3) processing operations in relation to the second RAT and can thus be realized in a leaner configuration than the first hardware module 102.

Moreover, the processing operations in relation to the second RAT are performed by spare software-controlled processing resources available on the first hardware module 102. Such (software-controlled) processing operations can be rather easily incorporated within the first hardware module 102 as no or only minor hardware changes are needed. As a further advantage, the first hardware module 102 can be incorporated in the device 100 either together with the second hardware module 104 (as illustrated in FIG. 1) or in a stand-alone configuration. Accordingly, the re-usability of the first hardware module 102 is increased.

Figure 2:
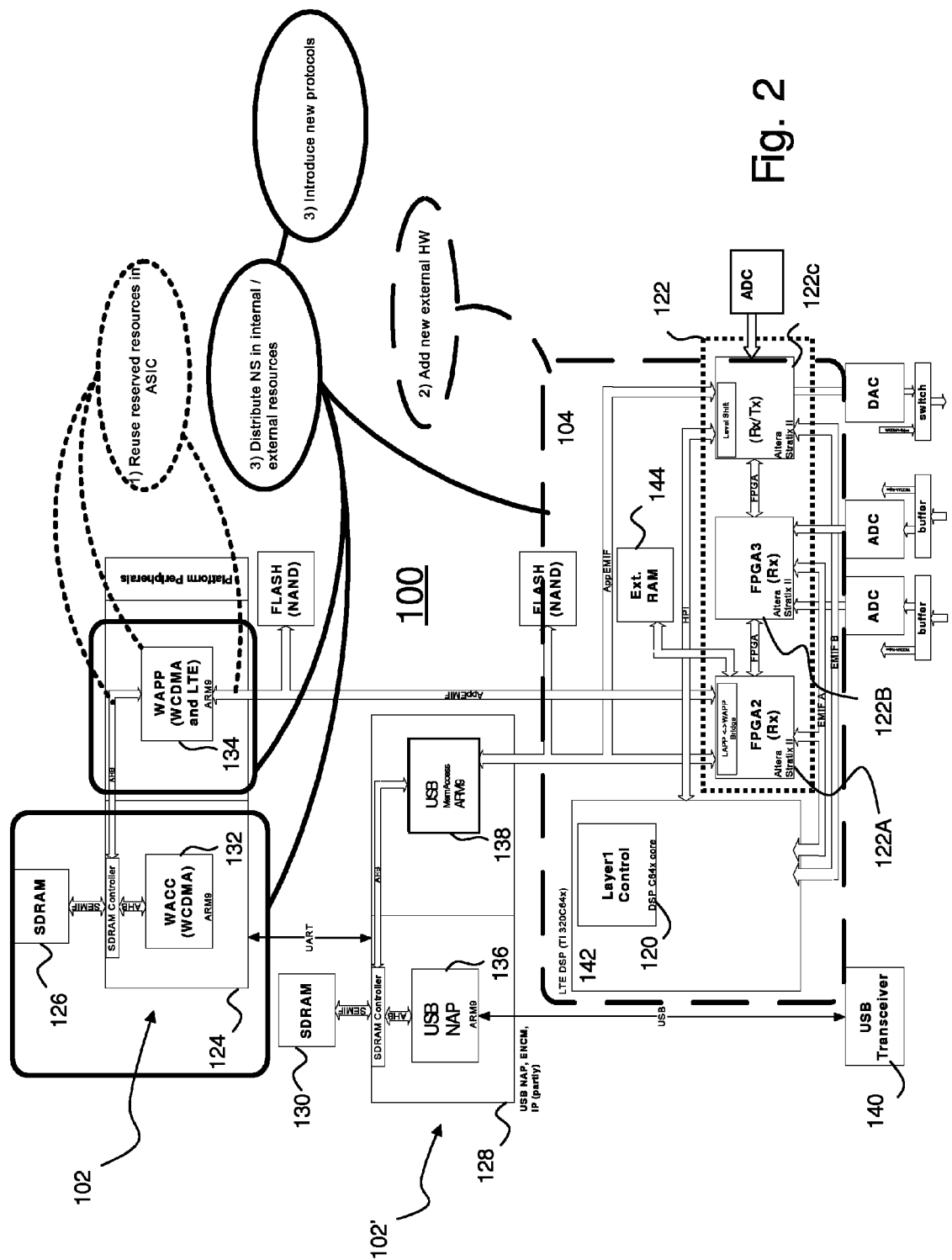
FIG. 2 shows a second embodiment of a device for providing network access in accordance with two radio access technologies.

FIG. 2 illustrates the hardware configuration of a second device embodiment. The device shown in FIG. 2 may be derived from the device of FIG. 1, and for this reason the same reference numerals will be used to designate the same or similar parts. It should be noted that the device shown in FIG. 2 may alternatively have a configuration different from the one depicted in FIG. 1.

The device 100 illustrated in FIG. 2 is configured to provide network access in accordance with two RATs, namely W-CDMA-based UMTS (Release 99/Release 6) and eHSPA (Release 7). The hardware configuration of the device 100 shown in FIG. 2 is derived from an existing hardware design of a device providing W-CDMA-based UMTS access only. This means that support for eHSPA had to be newly added to the existing design as will now be explained in more detail. It should be noted that the present invention is also applicable to other support scenarios not illustrated in the drawings, such as adding LTE support to an existing W-CDMA-based UMTS hardware platform.

In the present embodiment, the previously existing hardware components include a first hardware module 102 comprising a W-CDMA baseband processing ASIC 124 ("W-CDMA module") as well as a further hardware module 102' comprising a Universal Serial Bus (USB) controller ASIC 128 ("USB module"). The W-CDMA module 102 further comprises a memory (a Synchronous Dynamic Random Access Memory, or SDRAM) 126 coupled via dedicated interfaces to the ASIC 124. In a similar manner, the USB module 102' comprises a memory (SDRAM) 130 coupled via dedicated interfaces to the ASIC 128.

Each of the W-CDMA baseband processing ASIC 124 and the LTE baseband processing ASIC 128 comprises software-controlled processing resources in the form of a pair of dedicated processors (ARM9 CPUs) 132, 134, 136, 138 each. Each of the processors 132, 134, 136, 138 has access to internal ASIC memory resources (and, additionally or alternatively, to external memory resources) that store the processing instructions (programs) controlling the respective processing operations carried out by the processors 132, 134, 136, 138. A first processor 132 of the W-CDMA baseband processing ASIC 124 performs, inter alia, network access-related processing operations ("WACC processor"), while the second processor 134, inter alia, application-related processing operations ("WAPP processor"). It must be emphasized that the individual processors 132, 134 perform further processing operations, and for this reason the terms WACC and WAPP have only be chosen to indicate the general purpose of the respective processor 132, 134.

The network access-related processing operations performed by the WACC processor 132 include layer 1 processing (mainly Release 99/Release 6 layer 1 processing such as 16 QAM and QPSK modulation and demodulation control, handling of common and control channels, etc.) as well as layer 2, layer 3 and higher layer processing (such as MAC, RLC, PDCP, RRC, and Internet Protocol processing) in accordance with 3GPP Release 99/Release 6. Not shown in FIG. 2 are hardware accelerators located as IP blocks on the ASIC 124 and likewise performing layer 1 processing in accordance with 3GPP Release 99/Release 6 (such as 16 QAM and QPSK modulation and demodulation, spreading, and channel coding). The application-related processing operations performed by the WAPP processor 134 include Voice-over-Internet Protocol (VoIP) processing and File Transfer Protocol (FTP) processing.

In the embodiment of FIG. 2, the USB module 102' is mainly used to provide high-speed network access to an external device (such as a Personal Computer or Laptop; not shown) that may be selectively coupled to the device 100 via a USB transceiver 140. For this reason, one of the tasks of processor 136 is USB-related Network Access Protocol (NAP) processing. The processor 136 thus runs the USB-related communication protocol stack and performs this task also for the WACC processor 132 in case the external device obtains W-CDMA based network access. The processing operations performed by the processor 136 thus include layer 1, 2 and 3 processing. The processor 138 is used to allow the processor 136 access external memory in which one or more of the layer 1 data, the layer 2 data and the layer 3 data are stored. The processor 138 further handles user data exchange between the WAPP processor 134 and the processor 136 for data transmitted via the USB transceiver 140.

Having thus discussed the configuration of the previously existing components of the hardware architecture illustrated in FIG. 2, the architectural changes made to provide additional support for eHSPA will now be described in more detail. It is important to note that these changes do not require a major re-design of any of the existing W-CDMA module 102 or USB module 102'. Instead, the existing hardware is to a large extent re-used with only minor modifications, and new hardware components are added. In brief, freely available hardware resources in the existing ASICs are dedicated to eHSPA-related processing, the existing ASICs are extended externally with new hardware components, and the network signalling is newly distributed.

As illustrated in FIG. 2 for the example of the W-CDMA module 102, the architectural changes regarding eHSPA support involve three distinct modifications. First, available processing capabilities of the W-CDMA baseband processing ASIC 124 (including reserved software-controlled processing resources) are re-used for specific eHSPA processing tasks. Second, a new hardware module 104 is added that comprises the necessary hardware components for eHSPA support ("eHSPA module"). Finally, in step three, eHSPA-related network signalling is distributed within the W-CDMA module 102. Furthermore, new communication protocols within the W-CDMA module 102 and between the W-CDMA module 102 and the eHSPA module 104 are introduced in the third step. While these individual steps will now be described in more detail in relation to the W-CDMA module 102, it will be appreciated that similar steps are performed in relation to the USB module 102'.

In the first step, spare, reserved or redundant hardware resources of the W-CDMA baseband processing ASIC 124 are dedicated to eHSPA-related processing tasks. Such hardware resources include additional or reserved software-controlled processing power of the WACC processor 132 and the WAPP processor 134, interfaces (such as memory or serial interfaces), interrupts as well as internal and external buses and bridges. Such resources may also include memory resources for storing processing instructions (e.g., in the form of one or more programs) related to eHSPA-specific processing operations. For example, new layer 2 software modules (MACevo, RLCevo for the downlink, PDCPevo, etc.) are stored in the available memory resources for being executed by the WAPP processor 134. The existing part of the W-CDMA baseband processing ASIC 124 is used to cover the unchanged requirements of eHSPA (compared to Release 99/Release 6) and the requirements of W-CDMA-based UMTS (Release 99/Release 6). Such existing parts include, for example, the legacy layer 2 software modules (MAC, RLC, PDPC, etc.). Additionally, a communication mechanism between the legacy software modules and the eHSPA software modules is provided. This communication mechanism will be described in more detail later on with reference to FIGS. 3 and 4.

Since the layer 3 and USB processing functionalities of the W-CDMA baseband processing ASIC 124 do not reach the performance needed to fulfil the eHSPA requirements, the corresponding functionalities of the USB module 102' are used by the eHSPA module 104. As a result, the USB module 102' has to be modified in a similar manner as the W-CDMA module 102 for the provision of eHSPA-based network access via the USB transceiver 140 to an external device. For example, reserved processing power of the processor 138 is used to perform eHSPA layer 1 layer 2 and layer 3 processing, and the corresponding processing instructions are stored in available memory resources of the USB controller ASIC 128.

As the second modification of the existing device architecture, the eHSPA module 104 with several new hardware components is added as shown in FIG. 1. The distribution of eHSPA processing among the W-CDMA and USB modules 102, 102' on the one hand and the eHSPA module 104 on the other hand allows a lean and flexible realization of the eHSPA module 104 using, for example, DSP and FPGA technologies instead of ASICs (although an ASIC-based implementation would in principle also be feasible). This approach optimizes the costs and risks associated with introducing eHSPA. Moreover, the processing load associated with high-speed eHSPA data transfer can be shared between one or both of the legacy modules 102, 102' and the new eHSPA module 104. Also, load sharing may occur among the processors residing on a single one of the hardware modules 102, 102'.

The main hardware components of the eHSPA module 104 include a DSP 142, several FPGAs 122A, 122B, 122C (jointly referred to as FPGAs 122), and a shared memory (RAM) 144 that is used in the present embodiment primarily for user data storage of layer 1 data and layer 2 data in the eHSPA downlink direction. The largest part of eHSPA layer 1 processing is performed by hardware accelerators as included in the FPGAs 122A. Layer 1 processing performed, for example, by the hardware accelerators in the FPGA 122B includes turbo decoding, transmission error control, and optional user data encryption (ciphering). The hardware accelerators of the FPGA 122B are primarily in charge of memory management (e.g., for providing Direct Memory Access, or DMA) in context with moving data from a layer 1 memory partition to a layer 2 memory partition. The hardware accelerators of the FPGA 122C perform, inter alia, 64 QAM demodulation and RAKE processing. The hardware accelerators of the FPGAs 122 are realized in the form of IP cores.

The DSP 142 further comprises a processor 120 that controls the hardware accelerators in the FPGAs 122 and other IP cores of the eHSPA module 104 in relation to eHSPA layer 1 processing operations. For example, the DSP 142 controls channel estimation for MIMO, antenna tracking for 64 QAM, frame based and slot based signal processing, RAKE setup, and so on. The software controlling the processor 120 is stored in local memory resources of the DSP 142.

As has been mentioned above, the third modification regarding the existing hardware architecture includes a splitting of network signalling internally within the existing hardware modules 102, 102'. In the exemplary case of the W-CDMA module 102, the network signalling is distributed among separate software modules running on the two different WACC/WAPP processors 123, 134. Specifically, Release 99/Release 6 signalling and eHSPA Enhanced Uplink (EUL) signalling is run on the WACC processor 132, while eHSPA downlink signalling is run on the WAPP processor 134.

Splitting the network signalling between two processors of one and the same hardware module has the advantage that the handling of eHSPA downlink traffic has less influence on the strict timing requirements of EUL uplink traffic. Additionally, more processor time will become available for downlink traffic processing. As a further advantage, direct access of the processors in charge of downlink traffic processing (the WAPP processor 134) to the user data in the external memory 144 as well as to the hardware accelerators of the eHSPA module 104 can be mentioned. In other words, the WAPP processor 134 sees the shared memory 144 as directly connected to and accessible by it. Moreover, a load sharing between the WACC/WAPP processors 123, 134 can be achieved in relation to eHSPA signal processing in the uplink and the downlink as will now be discussed in more detail with reference to FIG. 3.

Figure 3:
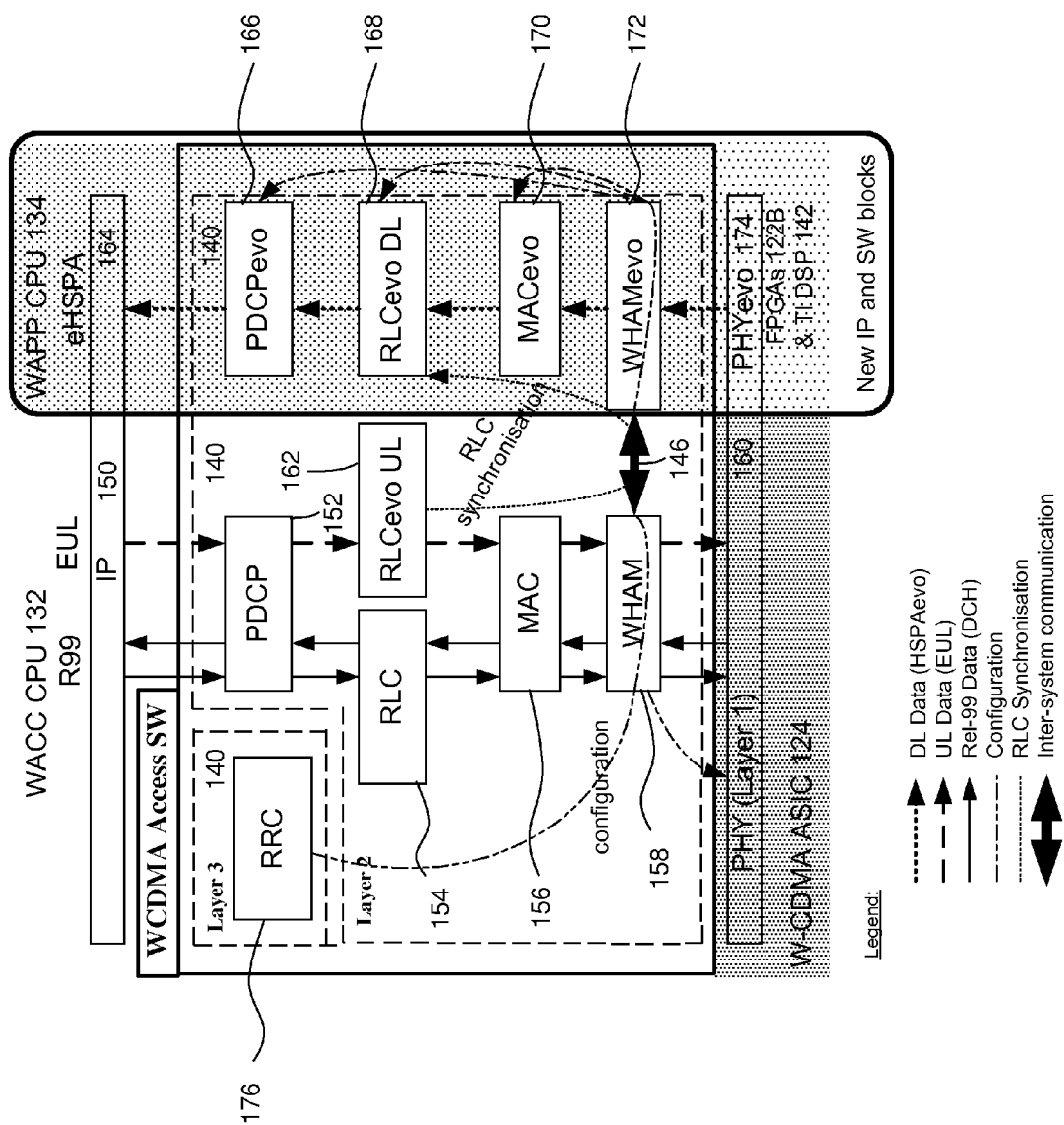
FIG. 3 is a schematic signalling diagram illustrating the communication protocol functions involved during operation of the second device embodiment shown in FIG. 2.

FIG. 3 schematically illustrates the stack of communication protocols in the lower communication layers for the device 100 of FIG. 1. Moreover, FIG. 2 shows how the newly added eHSPA functionalities are distributed among the existing and new hardware and software components.

In short, the left hand side of FIG. 3 depicts the existing software modules (with some exceptions), while the right hand side illustrates (again with some exceptions) the new software modules. As illustrated on the upper part of FIG. 3, the (new and existing) software modules for IP layer processing, layer 3 processing and layer 2 processing run on either the WACC processor 132 (left hand side) or on the WAPP processor 134 (right hand side) of the W-CDMA baseband processing ASIC 124. The software modules for Layer 1 processing control (e.g., for controlling the layer 1 hardware accelerators) run on one or both of the processors 132, 134 of the W-CDMA baseband processing ASIC 124 (left hand side) as well as on the DSP 142 (right hand side). The hardware accelerators for layer 1 processing are located on the W-CDMA baseband processing ASIC 124 (as far as W-CDMA is concerned) as well as on the FPGAs 122 such as FPGA 122A (for eHSPA layer 1 processing).

One exception to the rule that the new software modules run on the WACC processor 132 is eHSPA EUL processing. Although newly introduced in context with eHSPA, EUL processing is mainly based on the existing software (and hardware) modules and thus performed by the WACC processor 132. Processing of eHSPA downlink traffic on the other hand is performed by the WAPP processor 134 using the newly introduced software modules. Thus two isolated data paths for eHSPA uplink traffic and eHSPA downlink traffic are created. Splitting of the data paths among the two different processors 132, 134 has the advantage that the strict timing requirements of EUL processing by the WACC processor 132 have less influence on eHSPA downlink traffic handling by the WAPP processor 134. Additionally, more processor time for eHSPA downlink traffic handling is obtained since the WAPP processor 134 is disburdened from EUL processing.

The splitting of eHSPA uplink traffic processing and eHSPA downlink traffic processing between the two different processors 132, 134 is facilitated by a newly established inter-processor communication link 146. The purposes of the communication link 146 include configuration and synchronisation signalling between software modules running on the different processors 132, 134. Moreover, the communication link 146 can be utilized to transfer both data and control information between the software modules. The communications performed via the communication link 146 are at least partially performed as memory-based communications via shared memory. Because of the communication link 146, the two different processors 132, 134 will appear to the outside as a single processing unit in relation to eHSPA uplink and downlink processing. Moreover, the eHSPA protocol stack will thus act as a single stack to the outside in spite of the fact that the various software modules are distributed among the two processors 132, 134.

As shown in FIG. 3, there exists a third data path that stretches in parallel to the EUL and eHSPA downlink data paths. The third data path is the legacy path adapted to perform Release 99/Release 6 uplink and downlink traffic processing on the DCH Data Channel. Each of the three paths depicted in FIG. 3 can be considered as a separate signal processing chain. In the following, the functions of the individual software modules arranged to form the three signal processing chains will be discussed in more detail.

The DCH data path on the left hand side of FIG. 3 includes in a conventional manner legacy components in the form of an IP module 150, a PDPC module 152, an RLC module 154, a MAC module 156, a W-CDMA Hardware Abstraction Module (WHAM) 158 as well as layer 1 processing components 160. The layer 1 processing components 160 include a PHY software module running on the WACC processor 132 as well as the corresponding hardware accelerators for layer 1 processing. The data path for EUL traffic is identical to the DCH data path in the uplink except for a replacement of the RLC module 154 with an RLCevo UL module 162.

The data path for eHSPA downlink processing includes a separate IP module 164 running on the WAPP processor 134, a PDCPevo module 166, an RLCevo DL module 168, a MACevo module 170, a WHAMevo module 172 as well as layer 1 processing components 174. The layer 1 processing components 174 include one or more software modules running on the DSP 142 as well as hardware accelerators residing on the FPGAs 122 and controlled by the DSP 142.

A layer 3 RRC module 176 executed by the WACC processor 132 handles the configuration of the various software modules running on the WACC processor 132 (including DCH and EUL). In addition, the RRC module 176 is also responsible for eHSPA configuration on the WAPP processor 134 and triggers the setup of the network signalling stack to enable eHSPA reception concurrently with EUL transmission. As illustrated in FIG. 3, the corresponding signalling between the WACC processor 132 and the WAPP processor 134 is transmitted via the communication link 146.

The legacy PDCP module 152 is essentially duplicated on the WAPP processor 134 into a new PDCPevo module 166 to handle eHSPA downlink traffic. The PDCPevo module 152 also handles flow control and data delivery in the eHSPA downlink direction.

The legacy RLC module 154 remains responsible for data transfer on the DCH. For eHSPA operation, the RLC functionality is split into two RLCevo sub-modules 162, 168. By synchronization signalling via the communication link 146 it can be guaranteed that the RLCevo sub-modules 162, 168 work in a synchronized manner. To this end, status information including RLC variables, window positions and so on are exchanged between the two sub-modules 162, 168. Additionally, a control mechanism for the synchronized handling of RLC control Physical Data Units (PDUs) is implemented within the sub-modules 162, 168. The RLCevo DL module 168 has direct access to an RLC hardware accelerator on one of the FPGAs 122. The RLC hardware accelerator is in charge of concatenating PDUs into IP packets internally within the FPGA.

The legacy MAC module 156 remains responsible for DCH processing as well as the EUL part of the EUL/eHSPA bearer. For eHSPA reception, the new MACevo module 170 is provided.

The main tasks of the WHAM module 158 and the WHAMevo module 172 include the provisioning of interfaces between layer 2 and layer 1 software modules. Additionally, interfaces between layer 2 software modules and various hardware components are provided.

Further optimizations may be performed in relation to MAC-hs reordering. For example, the MAC-hs reordering functionality for eHSPA downlink processing may remain in layer 2, but the out-of-sequence MAC-hs PDUs (or transport blocks) may remain stored in a PHY buffer (e.g., on the FPGA 122A) instead of being copied to the memory of the MACevo module 170 (such as the SDRAM 126 shown in FIG. 2).

Figure 4:
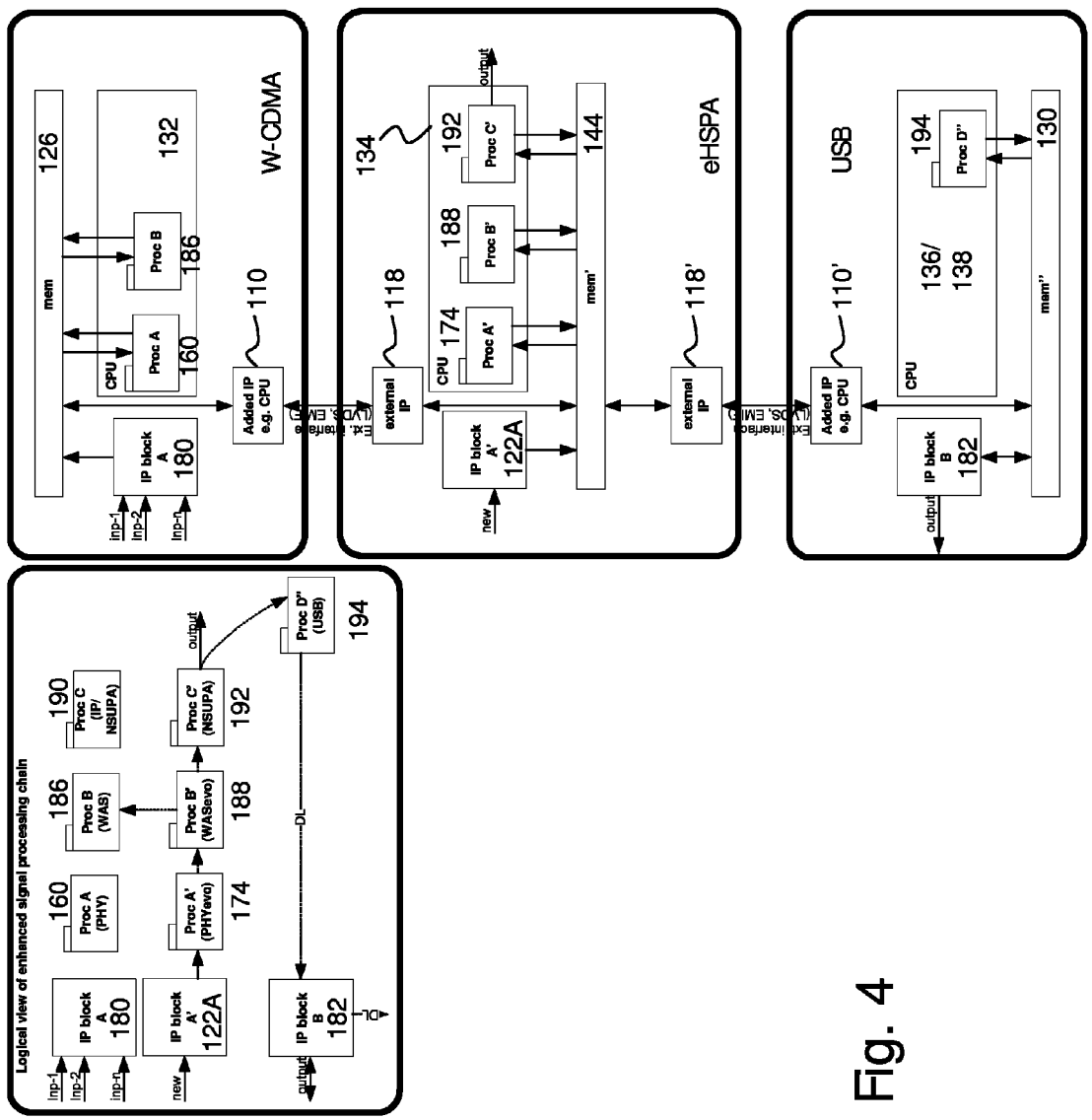
FIG. 4 illustrates the signal processing chain during operation of the second device embodiment shown in FIG. 2.

In the following, the functions of the individual software modules arranged to form the signal processing chain for the eHSPA downlink direction on the right hand side of FIG. 3 will be discussed in more detail with reference to the schematic illustrations of FIG. 4. The left hand side of FIG. 4 shows an overall logical view of the signal processing chain in the eHSPA downlink direction. On the right hand side, the distribution of the individual processing operations among the three hardware modules 102, 102' and 104 is depicted.

In FIG. 4 the same reference numerals as in FIGS. 1, 2 and 3 have been used to designate the same components. The additional components introduced in FIG. 4 include an IP block 180 situated on the W-CDMA baseband processing ASIC 124 (see FIG. 2) and comprising hardware accelerators for Release 99/Release 6 layer 1 processing (such as modulation and demodulation) as well as a further IP block 182 situated on the USB controller ASIC 128 (see FIG. 2) and comprising the functionalities to handle user data transfer via the USB transceiver 140 towards the external device. The third IP block 122B has already been described with reference to FIG. 2 above and provides the hardware accelerators for novel eHSPA features, including 64QAM modulation and MIMO.

The W-CDMA Access Software (WAS) is included in the software module WAS 186, which essentially comprises the modules 152, 154, 156, 158 and 176 of FIG. 3. The eHSPA Access Software (WASevo) is included in a further software module WASevo 188. The WASevo module 188 essentially comprises the software modules 162, 166, 168, 170 and 172 of FIG. 3.

The Network Signalling User Plane Access (NSUPA) software modules 190, 192 constitute interfaces which handle the user data part of the network signalling. For example, the NSUPA module 192 will handle the user data part of the network signalling towards USB and the external device attached via the USB transceiver 140. In the downlink, the NSUPA software module 192 running on the WAPP processor 134 will handle the data access part. The NSUPA software module 190 will be running on the WACC processor 132 and handle communication between eHSPA (hardware module 104) and W-CDMA (hardware module 102). A USB software module 194 is configured to run on the processor 136 and basically includes the drivers for the USB transceiver 140 (see FIG. 2).

Now turning to the right hand side of FIG. 4, it can be seen that each functional unit ("W-CDMA", "eHSPA", "USB") comprises one or more interfaces 110, 110', 118, 118 for interconnecting the associated hardware modules. The interfaces 110, 110' of the W-CDMA module 102 and the USB module 102' additionally comprise an interface processor (CPU) to control the inter-module communication. While no interface processors are shown for the interfaces 118, 118', such processors can be added as needed.

The main task of the interface processors provided by the interfaces 110, 110' is a synchronization of the memory-based communication between components of the eHSPA module 104 and components of the W-CDMA and LTE modules 102, 102' (see, e.g., arrow 146 in FIG. 3). As shown on the right hand side of FIG. 4, this memory-based communication is performed via one or more of the memories 126, 130, and 144. Moreover, internal memory of the ASICs 124 and 128 and of the DSP 142 (see FIG. 2) could alternatively, or in addition, be involved.

As is known in the art, memory-based communication between two software or hardware components can be performed by co-using one or more portions in a specific memory via shared pages. The shared pages will be mapped into virtual address spaces of the different components. The actual communication between the components then occurs via read and write instructions to the shared pages.

During the memory-based communication, the interface processors are mainly in charge of synchronizing accesses coming from different hardware modules to the same memory portion. Moreover, the interface processors hide or protect the memories or other components of the W-CDMA and USB modules 102, 102' from accesses by the eHSPA module 104. To this end, translation or encryption techniques may be applied by the interface processors. Of course, the interfaces 110, 110', 118, 118' may not only be used for the purpose of memory-based communication, but also for various other purposes, including the access, manipulation, and change of data such as user data (payload) accessible via another hardware module.

The actual communication between different hardware modules is based on a predefined communication protocol in accordance with a master-slave concept. In the present case, each of the legacy hardware modules 102 and 102' acts as master in relation to the newly introduced hardware module 104, which thus acts as slave and provides services to the other hardware modules 102, 102' under control thereof.

In the following, the operation of the components of the eHSPA downlink signal processing chain illustrated on the right hand side of FIG. 3 and in FIG. 4 will be described in more detail with reference to the schematic signalling diagram of FIG. 5.

Figure 5:
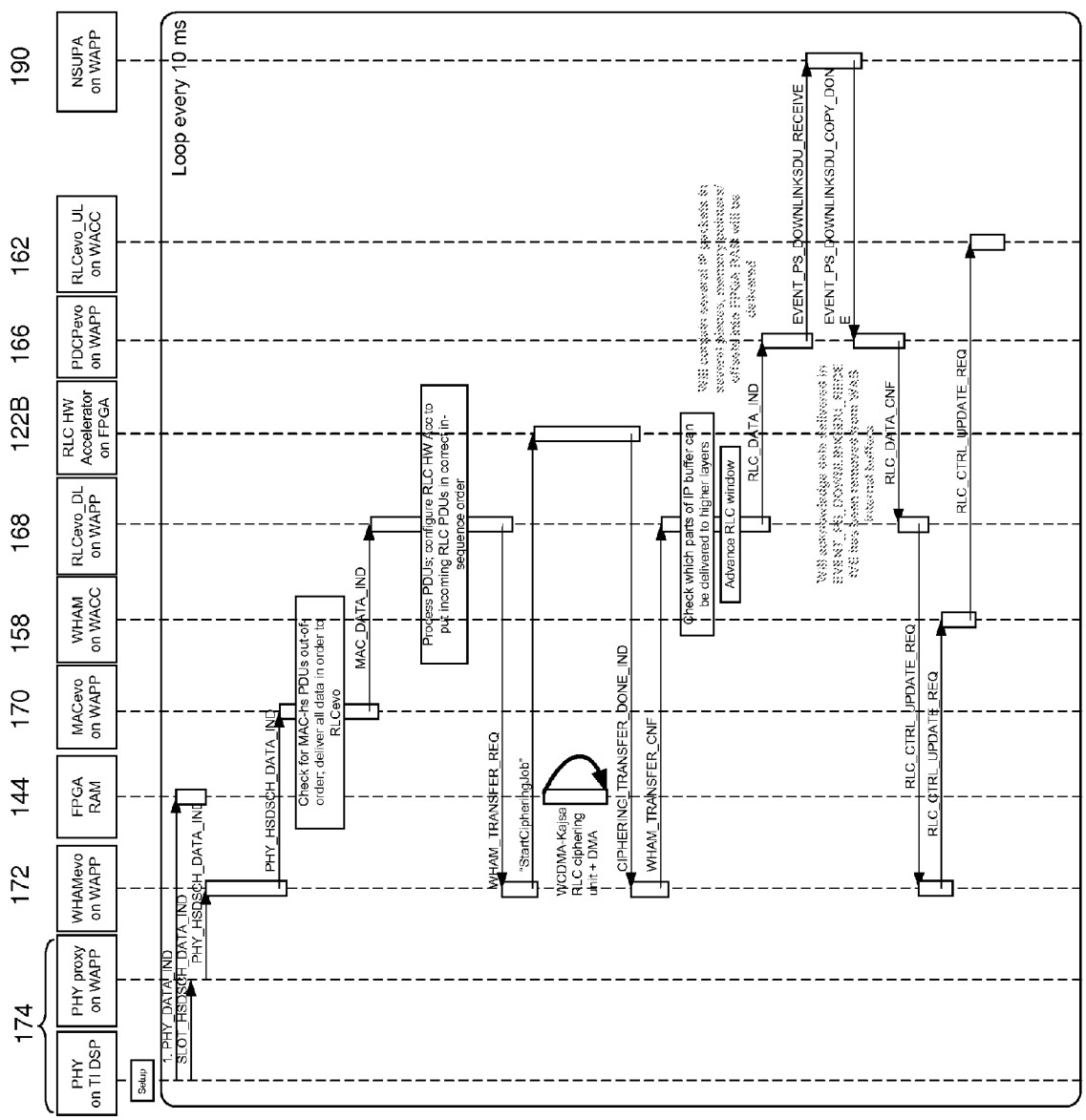
FIG. 5 illustrates the downlink data flow during operation of the second device embodiment shown in FIG. 2

As illustrated in FIG. 5, eHSPA downlink reception starts with layer 1 processing operations performed by the hardware accelerators of FPGA 122A. The output of the corresponding IP blocks is stored in the shared memory 144 and further processed by the PHYevo module 174, the WASevo module 188 and the NSUPA module 192 before being output. It is important to note that the data will remain in the shared memory 144 until it is sent for example to the external memory 126 associated with the processors 132, 134 (see FIG. 1), but the data will remain accessible by the hardware modules 102, 104 for content analysis.

As illustrated in FIG. 5, in a first signalling step the PHY component 174 will send an IPC message to the WHAMevo module 172 executed on the WAPP processor 134 regarding a notification that new TBs (MAC-hs PDUs) have been stored in the shared memory 144 and are ready for further processing. The WHAMevo module 172 will then send a message to the MACevo module 170 regarding the availability of new TBs in the shared memory 144. The MACevo module 170 will notify the RLCevo DL module 168, which will analyse the data in the shared memory 144.

In a further step, data will be moved by using a Direct Memory Access (DMA) IP hardware accelerator in the FPGA 122B. The DMA hardware accelerator will move the respective data from the layer 1 data partition to a layer 2 data partition in the shared memory 144. The WHAMevo module 172 will then inform the RLCevo DL module 168, which will again inform the PDCPevo module 166 with IPC that the moved data within the shared memory 144 is valid.

The NSUPA software module executed on the WAPP processor 134 will in a next step be informed about the valid data and will access the shared memory 144 for reading the data from the layer 2 data partition and sending the data to either the IP block 182 of FIG. 4 (for further transmission towards via the USB transceiver 140 to an external device) or to the WAPP processor 134 for being consumed by a local application.

Figure 6:
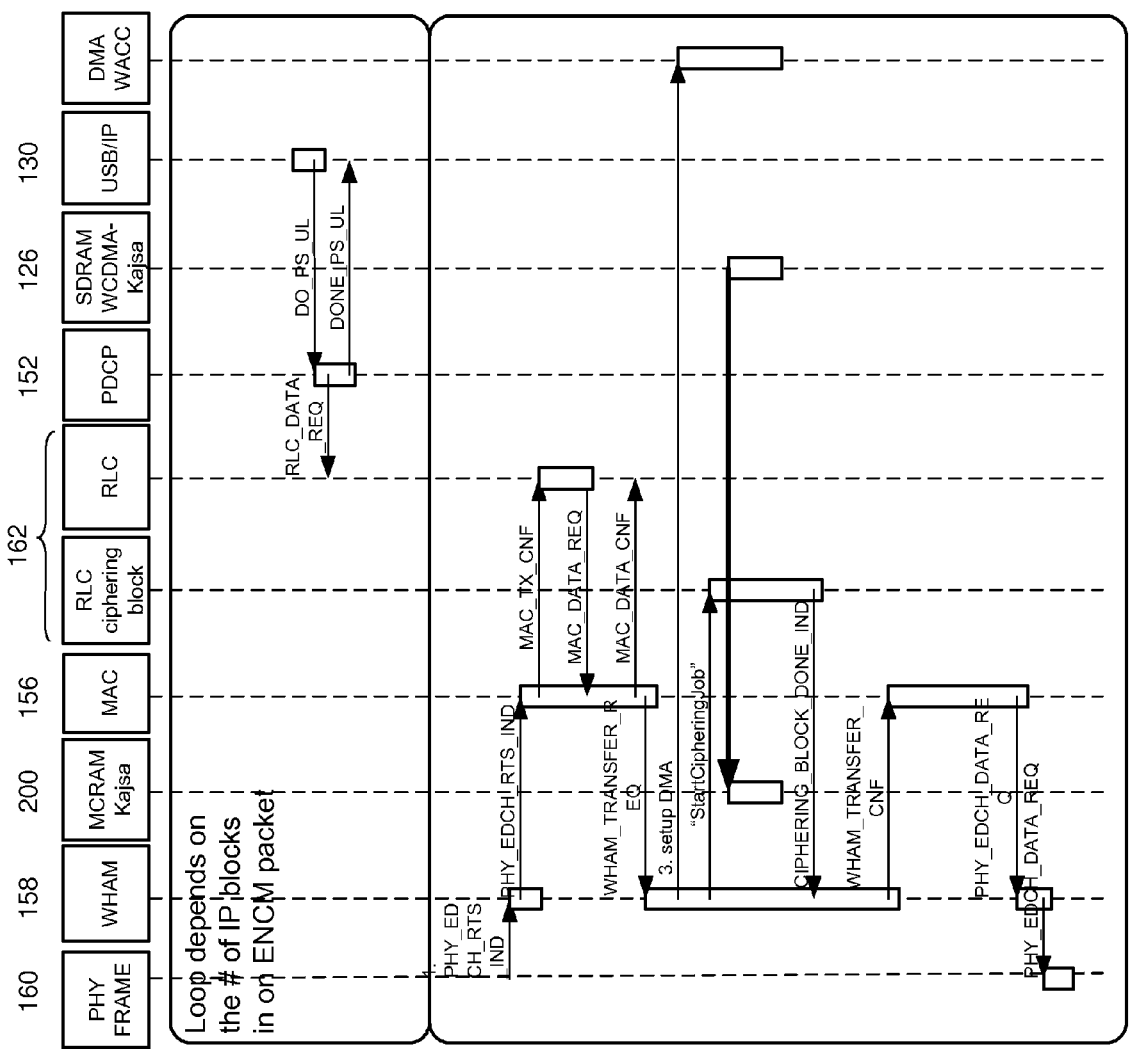
FIG. 6 illustrates the uplink data flow during operation of the second device embodiment shown in FIG. 2.

For the sake of completeness, the uplink data flow on the EUL (see FIG. 3) will now also be described with reference to the schematic signalling chart of FIG. 6. The upper signalling part of FIG. 6 shows that in the uplink data is received dependent on the layer 1 timing. The corresponding data is collected by the USB/IP software module 130 and the PDCP software module 152. If credit is available in layer 1 and a request for data is present, then the lower signalling part illustrated in FIG. 6 will start and will handle the necessary signal processing steps.

In a first signalling step, the PHY components 160 of the W-CDMA baseband processing ASiC 124 indicate to the MAC module 156 that they are ready to send the data on the EDCH. The MAC module 158 then informs the RLC module 162 mapped onto the E-DCH. The RLC module 162 answers to the MAC module 156 with a MAC_DATA_REQ message containing links to RLC headers and payload.

The MAC module 156 will then set up ciphering (and bit shifting) jobs which will support the creation of the MAC-es PDU in an internal memory (MCRAM) 200 of the W-CDMA baseband processing ASIC 124. The ciphering jop will put the payload in the right place within the PDU to be filled. Space between the payload elements will be reserved for the RLC headers which will be filled by the MAC module 156 later on. After this process has been completed and the MAC headers are written, the PHY components 160 are informed with a PHY_EDCH_DATA_REQ message that data is ready to be transmitted.

As has become apparent from the above, the techniques proposed herein permit a fast implementation of new RATs in combination with existing hardware platforms. The existing hardware platforms remain to a large extent untouched as essentially only the corresponding software modules need to be modified or extended. In addition to many further advantages that have become apparent from the above, the techniques discussed herein permit a load sharing among software-controlled processing resources (such as CPUs) to handle the typically higher data rates introduced by the new RATs.

While the present invention has been described with respect to particular exemplary embodiments, those skilled in the art will recognize that the present invention is not limited to the specific examples described and illustrated herein. It is to be understood that this disclosure is only illustrative. Accordingly, it is intended that the invention be limited only by the scope of the claims appended hereto.

The invention claimed is:

1. A device for providing network access in accordance with at least two radio access technologies, the device comprising:
 a first hardware module comprising:
  a first hardware accelerator configured to perform at least layer 1 processing in accordance with a first radio access technology;
  first software-controlled processing resources configured to perform at least layer 2 processing for the first radio access technology and for a second radio access technology; and
  a first interface configured to couple the software-controlled processing resources to a second hardware module providing at least layer 1 processing capabilities in accordance with the second radio access technology;
 a second hardware module comprising:
  a second hardware accelerator configured to perform at least layer 1 processing in accordance with the second radio access technology; and
  a second interface configured to couple the second hardware accelerator to the first interface of the first hardware module.

2. The device of claim 1, wherein at least one of the first hardware accelerator and the second hardware accelerator is comprised by an Intellectual Property (IP) block.

3. The device of claim 1, wherein the second hardware module further comprises second software-controlled processing resources.

4. The device of claim 3, wherein the second software-controlled processing resources are configured to perform at least one of supplemental layer 2 processing for the second radio access technology and control of the second hardware accelerator.

5. The device of claim 3, further comprising a shared memory configured to enable memory-based communication between the first software-controlled processing resources of the first hardware module and the second software-controlled processing resources of the second hardware module.

6. The device of claim 5, wherein the shared memory resides at least partially on the first hardware module or can be accessed via the first hardware module, and wherein the first hardware module further comprises an interface processor coupled between the second hardware module and the shared memory and configured to synchronize accesses to the shared memory by the first hardware module and the second hardware module.

7. The device of claim 6, wherein the interface processor is further configured to hide the internal configuration of the first hardware module from accesses from the second hardware module.

8. The device of claim 1, wherein layer 1 processing includes one or more of the following signal processing operations: modulation, spreading, channel coding, turbo coding and encryption.

9. The device of claim 1, wherein layer 2 processing includes one or more of the following signal processing operations: Medium Access Control, Radio Link Control, and Packet Data Convergence Protocol processing.

10. The device of claim 1, wherein the first hardware module comprises an Application Specific Integrated Circuit.

11. The device of claim 1, wherein the second hardware module comprises at least one of a Digital Signal Processor and a Field Programmable Gate Array.

12. The device of claim 1, wherein the first radio access technology is a 3GPP Release 6 or lower radio access technology and wherein the second radio access technology is a 3GPP Release 7 or higher radio access technology.

13. A device for providing network access in accordance with at least two radio access technologies, the device including a first hardware module comprising:
 a first hardware accelerator configured to perform at least layer 1 processing in accordance with a first radio access technology;
 first software-controlled processing resources configured to perform at least layer 2 processing for the first radio access technology and for a second radio access technology; and
 a first interface configured to couple the software-controlled processing resources to a second hardware module providing at least layer 1 processing capabilities in accordance with the second radio access technology;
 wherein the first software-controlled processing resources comprise a first processor configured to perform at least layer 2 processing for the first radio access technology and a second processor configured to perform at least layer 2 processing for the second radio access technology.

14. The device of claim 13, wherein the first processor performs layer 2 processing for the second radio access technology in a first communication direction and the second processor performs layer 2 processing for the second radio access technology in a second communication direction opposite to the first communication direction.

15. The device of claim 14, further comprising an inter-processor communication link between the first processor and the second processor, wherein the communication link is configured to synchronize layer 2 processing between the first processor and the second processor, and wherein the synchronization is performed for the second network access technology between communications in the first communication direction handled by the first processor and communications in the second communications direction handled by the second processor.

16. The device of claim 13, further comprising an inter-processor communication link between the first processor and the second processor.

17. The device of claim 16, wherein the communication link is configured to synchronize layer 2 processing between the first processor and the second processor.

18. The device of claim 16, wherein the first processor further performs layer 3 processing, and wherein the communication link is configured to send at least one of layer 3 configuration and setup commands for the second radio access technology from the first processor to the second processor.

19. The device of claim 18, wherein layer 3 processing comprises Radio Resource Control.

* * * * *